United States Patent [19]

Kohlmeier

[11] Patent Number: 4,731,824
[45] Date of Patent: Mar. 15, 1988

[54] CHIME PULSER FOR PHONE CALL BACKUP INTERPRETER

[75] Inventor: Eugene H. Kohlmeier, West Webster, N.Y.

[73] Assignee: Rotelcom, Inc., Fairport, N.Y.

[21] Appl. No.: 836,639

[22] Filed: Mar. 5, 1986

[51] Int. Cl.$^4$ .............................................. H04M 1/00
[52] U.S. Cl. ................................. 379/265; 379/263; 379/164; 379/374; 379/376
[58] Field of Search ............... 379/164, 263, 265, 266, 379/374, 375, 376, 112, 113, 210, 214, 157, 309

[56] References Cited

U.S. PATENT DOCUMENTS

| | | | |
|---|---|---|---|
| 3,679,831 | 7/1972 | Bonsky | 379/376 |
| 3,842,216 | 10/1974 | Owen et al. | 379/376 X |
| 3,916,117 | 10/1975 | Matheny | 379/164 |
| 4,004,106 | 1/1977 | Yachabach et al. | 379/164 X |
| 4,055,731 | 10/1977 | Angner et al. | 379/164 |
| 4,063,044 | 12/1977 | Stephan | 379/164 X |
| 4,080,517 | 3/1978 | Moricca et al. | 379/164 X |
| 4,228,324 | 10/1980 | Rasmussen et al. | 379/164 X |

FOREIGN PATENT DOCUMENTS

| | | | |
|---|---|---|---|
| 2142964 | 4/1972 | Fed. Rep. of Germany | 379/263 |
| 2818931 | 10/1979 | Fed. Rep. of Germany | 379/265 |
| 0070673 | 4/1983 | Japan | 379/263 |

Primary Examiner—Jin F. Ng
Assistant Examiner—Matthew E. Connors
Attorney, Agent, or Firm—Shlesinger, Fitzsimmons & Shlesinger

[57] ABSTRACT

The flashing light, which is used by automatic telephone call distributing equipment to indicate that incoming calls have backed up and are awaiting service, generates voltage signals the frequency of which increases with the increase in the number of calls awaiting service. The voltage signals control several relays energized one at a time and successively as the signal frequency increases, and one such relay causes the emitter-collector circuit of a transistor momentarily to conduct each time the relay is energized and deenergized, respectively. Each time the transistor conducts it energizes another relay which momentarily energizes a bell chime to produce an audible signal.

13 Claims, 2 Drawing Figures

CHIME PULSER FOR PHONE CALL BACKUP INTERPRETER

BACKGROUND OF THE INVENTION

This invention relates to equipment for monitoring and selectively distributing incoming telephone calls to a plurality of telephones, and more particularly to means for providing an audible indication of the quantity of unanswered incoming calls that are awaiting service.

It is quite common to use special call distributing equipment for storing and selectively connecting incoming telephone calls to a plurality of phones connected to a single line. With this equipment, as the number or incoming calls increases beyond the available telephones, the calls are placed on "hold", and are connected to a telephone as soon as one becomes available. Moreover, some such equipment has been supplemented with a so-called flash interpreter device for indicating visually the number of incoming calls which are awaiting service.

With one such flash interpreter device the number of calls awaiting service are converted to pulsating electrical signals, which increase in frequency in correspondence with the increase in the number of incoming telephone calls which are on "hold". These pulsating signals are then used selectively to illuminate a series (e.g. three) differently colored warning lights, one of which is illuminated when the call backup signal is at a relatively low frequency, another of which is illuminated when the frequency of the call backup signal increases to another, higher range, and a third one of which is illuminated when the signal increases to still a third frequency range higher than both the first and second ranges. In this manner the person or persons supervising the telephone operation can readily perceive the relative quantity of incoming calls that are backed up at any instant.

One of the disadvantages of this type of device is that, when the supervisor of the telephone operators becomes very busy, he or she has a tendency to overlook the warning lamps, and therefore does not take any available action to minimize the backup of calls, particularly if the warning lamps are placed overhead or near one end of the room containing the phones.

It is an object of this invention, therefore, to provide means for improving telephone monitoring equipment of the type described. To this end it is an object also to provide for such equipment audible alarm means which operates intermittently to inform supervisory personnel, or the like, that incoming telephone calls have reached, or fallen below, predetermined levels.

Still a more specific object of this invention is to provide a novel phone call backup interpreter mechanism which produces an audible chime tone upon predetermined changes in calls awaiting service.

Other objects of the invention will be apparent hereinafter from the specification and from the recital of the appended claims, particularly when read in conjunction with the accompanying drawing.

SUMMARY OF THE INVENTION

The interpreter equipment includes a phototransistor which is positioned to receive the blinking light signals of a backup call indicator that forms part of conventional automatic call distributor equipment. The phototransistor generates intermittent electrical signals, which selectively energize one of a plurality (three) of call backup indicating relays, depending upon the quantity of calls awaiting service. One of these relays controls a chime tone warning device, which includes a first, two position switch that is movable from one to the other of its positions each time the last-named relay is energized or deenergized.

Each time the first switch is moved to one of its two positions it applies to low DC voltage signal to the input of one or the other of two solid state, one-shot elements, the outputs of which are connected through an OR gate to the base of an NPN transistor. Each time a signal is momentarily applied by the OR gate to the base of the transistor, its emitter-collector circuit is momentarily switched to a conducting mode, therefore momentarily energizing another relay which is connected in series with the emitter-collector circuit. This relay momentarily closes a second set of relay contacts which cause momentary energization of a bell chime coil thereby producing an audible chime tone.

THE DRAWING

FIG. 1 is a schematic wiring diagram illustrating incoming telephone monitoring equipment of the type with which this invention is related; and FIG. 2 is a wiring diagram illustrating a call backup interpreter made according to one embodiment of the invention, and adapted to be connected with monitoring equipment of the type shown in FIG. 1.

DETAILED DESCRIPTION OF THE PREFERRED EMBODIMENTS

Figure 1:
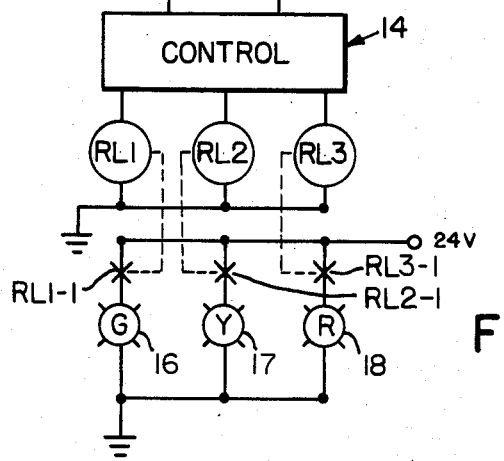

Referring now to the drawing by numerals of reference, and first to FIG. 1, L denotes a signal lamp which forms part of known automatic call distributor equipment, such as for example the type sold by Northern Telecom under the designation SL-1 System. When there are no incoming calls the lamp L is deenergized. When and if incoming calls begin to backup, the lamp L will begin to blink on and off at a rate or frequency which corresponds to the amount of incoming telephone calls which are backed up and awaiting distribution by the SL-1 System. The illumination of the lamp L is directed by a tubular housing 10 onto a phototransistor 12, the output of which is connected to a control device denoted generally at 14. Device 14, known as an optically coupled lamp flash interpreter, converts the intermittent flashes or illumination of lamp L into a series of voltage signals or pulses. These pulses control at the output of device 14 three relays RL1, RL2 and RL3, which are energizable selectively and one at a time depending upon the quantity of the telephone calls that are backed up.

Typically control 14 may be designed to energize relay RL1 when a first, low quantity of calls are awaiting service, such as for example when the phototransistor 12 generates in controller 14 anywhere from one to approximately 60 voltage pulses per minute. Relay RL2 could be designed to be energized when ever a second or larger group of incoming calls is backed up, for example in the range which would produce approximately 60 to 120 pulses/min., which relay RL3 may be designed to be energized when the number of backed up incoming calls enters a third, still higher range, for example such as to produce in excess of approximately 120 pulses/min. in controller 14.

As shown in FIG. 1, one of the functions of the three relays RL1, RL2 and RL3 is to control the operation of three different warning lamps 16, 17 and 18, which is practice may be differently colored, for example green, yellow and red, respectively. These lamps are connected in parallel with each other and in series with three different relay switches RL1-1, RL2-1 and RL3-1 between a twenty-four volt power supply and ground. The switches RL1-1, RL2-1 and RL3-1 are in turn controlled by the relays RL1, RL2 and RL3, respectively.

With this construction, whenever the number of incoming calls awaiting service falls in the lower range (approximately 1-60 p/m) the relay RL1 will be enerigzed, and therefore will close its switch contacts RL1-1, and will energize the green lamp 16. On the other hand, when the number of calls awaiting service rises to the second range (approximately to 60 to 120 p/m) relay RL1 will become deenerigzed and relay RL2 will become energized, thereby closing its contacts RL2-1, thus deenergizing the green lamp 16 and energizing the yellow lamp 17. Finally, whenever the number of calls awaiting service enters the third or uppermost range (i.e., in excess of 120 p/m), the relay RL2 will become deenergized, and the relay RL3 will become energized to close its contacts RL3-1 and energize the red lamp 18. Conversely, of course, as the calls awaiting service decline, for example on a gradual scale, then the lamp 18 will become deenergized and the lamps 17 and 16 will become successively energized until all of the lamps are deenergized when the number of incoming calls awaiting service reaches zero.

The advantage of this system is that the supervisor of the telephones may at any instant glance at the lamps 16, 17 and 18 and determine, visually, the relative quantity of incoming calls that are awaiting service. This enables the supervisor to adjust the available equipment to minimize the backup, for example by placing more telephones in service, if required.

Figure 2:
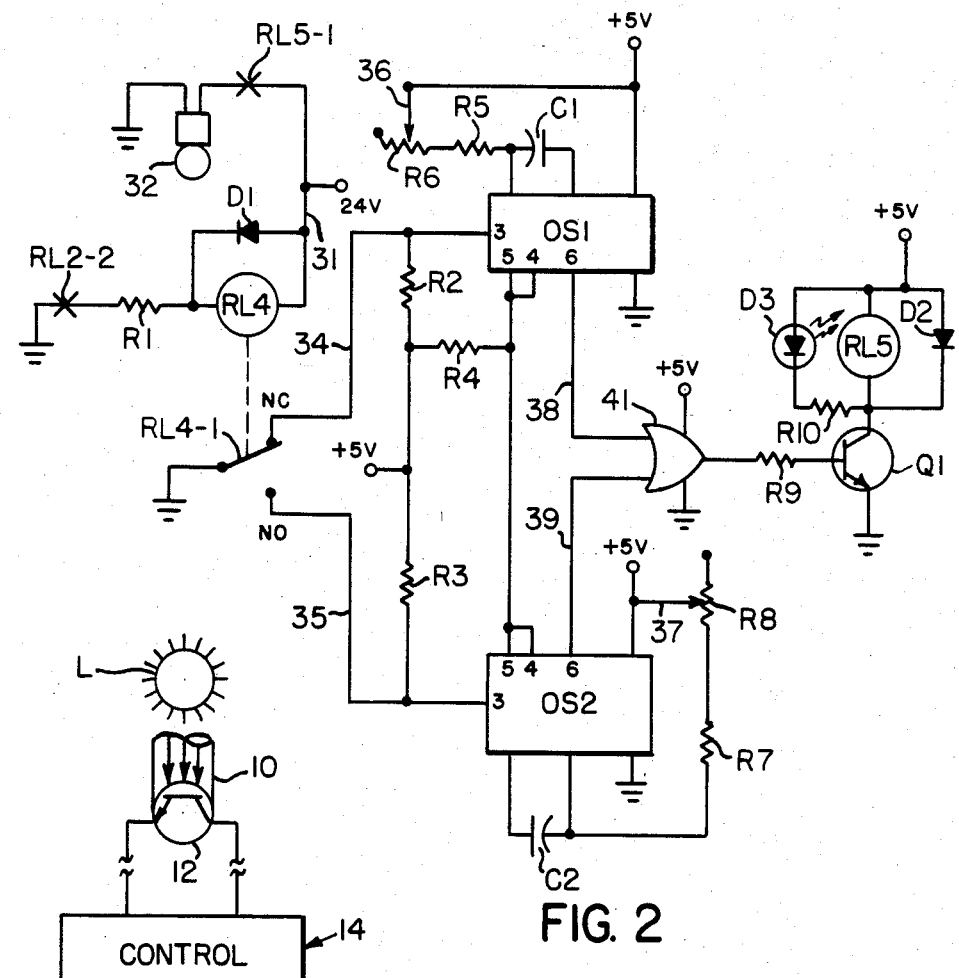

Referring now to FIG. 2, RL2-2 denotes a pair of normally open relay contacts, which in the embodiment illustrated, are controlled by the relay RL2 of FIG. 1. The contacts are connected at one side to ground, and at the opposite side through a resistor R1 to one side of a diode D1 and the coil of a relay RL4, which are connected in parallel with each other between the resistor R1 and a line 31, which is also connected to a twenty-four volt power supply. Line 31, it will be noted, is also connected through another set of normally open relay contacts RL5-1 and the operating coil of a bell chime 32 to ground for a purpose noted hereinafter.

The relay RL4 operates a switch contact RL4-1, which is connected at one end to ground, and which is moveable at its opposite end selectively into engagement with a normally closed terminal NC, when the relay coil RL4 is deenergized, and into engagement with a normally open terminal NO, when relay RL4 is energized. Terminals NC and NO are connected by lines 34 and 35, respectively, to the inputs (pins 3) of two one-shot elements, or monostable multivibrators OS1 and OS2, which may be of the type sold by Texas Instrument under the designation 74121. The inputs of elements OS1 and OS2 are also connected through resistors R2 and R3 to a five volt power supply, which also supplies power through a resistor R4 to pins 4 and 5 of each elements OS1 and OS2. Connected across two timing pins of OS1 is a capacitor C1, one side of which is connected through a resistor R5 and the sliding contact 36 of a variable resistor R6 to the five voltage supply. Likewise, two timing pins of the one-shot OS2 are connected to opposite sides of a further capacitor C2, one side of which is connected through a resistor R7 and the sliding contact 37 of another variable resistor R8 to the five volt power supply.

The output pins of elements OS1 and OS2 are connected by lines 38 and 39 to the input of a quad-input OR gate 41, the output of which is supplied through a resistor R9 to the base of an NPN transistor Q1. Transistor Q1 controls the operation of a relay RL5, which is connected in series with the emitter-collector circuit of Q1 to ground, and in parallel with a blocking diode D2. Also, a light emitting diode D3, which is connected in series with a resistor R10 across relay RL5, is energized whenever the operating coil of relay RL5 is energized.

The previously described relay contacts RL5-1, which are normally open, are momentarily closed whenever the transistor Q1 causes the relay RL5 to be energized. Each time the contacts RL5-1 close the operating coil of the bell chime 32 is energized momentarily, thereby to cause the chime to emit an audible sound or tone. Consequently, a warning tone is emitted each time that relay RL2 is either energized or deenergized.

In use, until such time that the number of incoming calls that are backed up or awaiting service exceeds a predetermined value, such as for example a value which will cause the phototransistor 12 to generate in the control 14 an intermittent signal voltage in excess of approximately 60 pulses per minute, the relay RL2 remains deenergized, so that the relay contact RL4-1 remains in contact with the terminal NC, and the relay RL5 is at such time deenergized. However, as the backlog increases, and the monitoring signal pulses exceed approximately 60 per minute, the relay RL2 will become energized, lamp 17 will become energized, the relay contacts RL2-2 (FIG. 2) will close, and the relay RL4 will also become energized and will shift its contact RL4-1 into engagement with terminal NO. This applies a signal by line 35 to the input of the one-shot element OS2, which therefore produces on its output line 36 a signal pulse the duration of which will depend upon the setting of the timing circuit represented by capacitor C2, resistor R7, and variable resistor R8. This signal pulse produces at the output of the OR element 41 a signal which is applied to the base of transistor Q1, which momentarily conducts and therefore momentarily energizes the operating coil for relay RL5, and at the same time diode D3. For the interval of time that relay RL5 is energized, which interval in practice is very brief, its relay contacts RL5-1 are momentarily closed, thereby momentarily energizing the bell chime 32, which therefore emits a tone signal to indicate that the quantity of incoming calls awaiting service has increased to the second level. Moreover, should the incoming calls continue to back up at a greater rate, for example until such time that the output signal generated from the phototransistor 12 exceeds, by way of example, approximately 120 pulses per minute, then relay RL2 will become deenergized and relay RL3 will become energized, thereby illuminating lamp 18. Also at this time the relay contacts RL2-2 will reopen, thereby deenergizing relay RL4, so that its contact RL4-1 returns to position shown in FIG. 2, whereby a pulse will be applied to the input OS1, which in turn will produce at its output line 38 a pulse, the duration of which will depend upon the setting of the wiper 36 for the variable resistor R6. The signal applied by the line 38 to the input of the OR element 41 will produce, as in the case of the previously described signal on line 39, momentary conduction in the emitter-collector circuit of Q1, thereby once again momentarily energizing relay RL5. This momentarily closes its relay contacts RL5-1, and once again energizes the bell chime 32. Also, as will be readily apparent, as the number of incoming calls awaiting service decreases back down toward a minimum quantity, the relay RL2 will be once again energized and subsequently deenergizd, and upon each such occurrence, the bell chime 32 will be momentarily energized, as will be readily apparent from the above description.

It will be apparent that the timing of the one-shot elements (i.e., the duration of each output signal) may be varied by adjusting the associated variable resistor R6 or R8. By way of example, if the capacitors C1 and C2 have values of 220 uf and resistors R5 and R7 have values of 3.3K, ohms, and R6 and R8 values of 25K ohms, the one-shot output signals can be adjusted to fall within approximately 0.5 sec to 5.0 sec. durations.

One of the primary advantages of this equipment is that, simply by utilizing the intermittent light emanating from the lamp L, the status of the imcoming telephone calls can be monitored both visually and audibly. Moreover, as the quantity of calls pass from one predetermined range to another, the bell chime 32 will be momentarily energized to attract the attention of the supervising personnel.

While this invention has been illustrated and described in detail in connection with only certain embodiments thereof, it will be apparent that it is capable of still further modification, and that this application is intended to cover any such modifications as may fall within the scope of one skilled in the art or the appended claims. For example, it obviously would be possible to use more or less in number of the relays controlled by the output of controller 14 without departing from this invention. Furthermore, each such output relay, if desired, could control a chime tone circuit of the type shown in FIG. 2. Also, the number of backup calls in the various ranges referred to above obviously could be varied as desired.

I claim:

1. In combination with automatic telephone call distributing equipment, having a flashing indicator light intermittently energized at a frequency which increases in proportion with the increase in incoming telephone calls awaiting service.
    a first plurality of relays connected to said equipment and responsive to the frequency of said flashing light to be energized one at a time and successively as said frequency increases,
    audible signal generating means, and
    means interposed between said relays and said signal generating means and operative momentarily to energize said signal generating means to produce an audible signal each time one of said relays is energized and deenergized, respectively.

2. The combination as defined in claim 1, wherein
    said one relay is disposed to be energized when said frequency is greater than a first predetermined value and less than a second predetermined value greater than said first value, and
    another of said relays is energized when said frequency falls below said first predetermined value.

3. The combination as defined in claim 1, wherein said means between said relays and said signal generating means comprises,
    means operative momentarily to produce a first electrical signal each time said one relay is energized, and a second electrical signal each time said one relay is deenergized, and
    switch means responsive to each appearance of either one of said electrical signals momentarily to energize said signal generating means.

4. The combination as defined in claim 3, including means for selectively adjusting the duration of each of said electrical signals.

5. The combination as defined in claim 4, wherein said means for producing said first and second electrical signals comprises
    a pair of one-shot multivibrator devices,
    means for energizing one of said devices to produce said first signal at the output thereof each time said one relay is energized, and
    means for energizing the other of said devices to produce said second signal at the output thereof each time said one relay is deenergized.

6. The combination as defined in claim 5, wherein said switch means comprises
    a further relay having a pair of normally open contacts in series with said audible signal generating means to energize the latter, when closed, and
    means connected in series with said further relay and responsive to the outputs of said devices momentarily to energize said further relay each time a voltage signal appears at the output of one of said devices.

7. The combination as defined in claim 1, including
    a first set of relay contacts controlled by said one relay and movable thereby between open and closed positions, respectively, each time said one relay to energized or deenergized.
    means for generating a first voltage signal of predetermined duration each time said contacts open,
    means generating a second voltage signal of predetermined duration each time said contact close, and
    means for momentarily energizing said audible signal generating means each time one of said first and second signals is generated.

8. The combination as defined in claim 7, including means for adjusting the duration of each of said first and second signals independently of one another.

9. Apparatus for monitoring telephone call backup associated with automatic call distributing equipment of the type which produces an intermittent control signal the frequency of which increases in proportion to the increase in incoming calls which have been backed up by the equipment and are awaiting service, comprising
    a plurality of switching devices each of which is operative in response to a different frequency range of said control signal to produce an output signal only when the frequency of said control signal is within the range associated with each device,
    means responsive to one of said devices to generate a first electrical signal whenever said one device produces an output signal, and to generate a second electrical signal when said output signal is no longer generated from the output of said one device, and
    means for producing an audible signal each time one of said first and second electrical signals, respectively, is generated.

10. Apparatus as defined in claim 9, including a warning lamp connected to the output of each of said devices and operative to be energized thereby when a signal is produced at the output of the associated device.

11. Apparatus as defined in claim 10, wherein a second one of said devices produces an output signal only when the frequency of said control signal is in a range less than the range associated with said one device, and a third one of said devices produces an output signal only when the frequency of said control signal is in a range greater than the range associated with said one device.

12. Apparatus as defined in claim 9, wherein said means responsive to said one device comprises a relay disposed to be energized when an output signal is produced at the output of said one device, and to be deenergizeed when said output signal disappears from the output of said one device, means for producing said first electrical signal when said relay is energized, and means for producing said second electrical signal when said relay is deenergized.

13. Apparatus as defined in claim 12, including means for selectively adjusting the duration of each of said first and second electrical signals independently of each other.

* * * * *